(12) United States Patent
Lee

(10) Patent No.: US 9,284,940 B2
(45) Date of Patent: Mar. 15, 2016

(54) MOTION TRANSLATING ASSEMBLY AND A WAVE ENERGY GENERATION SYSTEM USING THE ASSEMBLY

(76) Inventor: Michael Fuquan Lee, Avon, OH (US)

( * ) Notice: Subject to any disclaimer, the term of this patent is extended or adjusted under 35 U.S.C. 154(b) by 499 days.

(21) Appl. No.: 13/700,471

(22) PCT Filed: Jun. 8, 2011

(86) PCT No.: PCT/US2011/039532
§ 371 (c)(1),
(2), (4) Date: Nov. 28, 2012

(87) PCT Pub. No.: WO2011/156435
PCT Pub. Date: Dec. 15, 2011

(65) Prior Publication Data
US 2013/0091838 A1    Apr. 18, 2013

Related U.S. Application Data

(60) Provisional application No. 61/397,257, filed on Jun. 9, 2010.

(51) Int. Cl.
*F03B 13/16*    (2006.01)
*F03B 13/18*    (2006.01)
*F16H 37/12*    (2006.01)

(52) U.S. Cl.
CPC ........... *F03B 13/1815* (2013.01); *F03B 13/186* (2013.01); *F16H 37/124* (2013.01); *F05B 2260/4031* (2013.01); *Y02E 10/38* (2013.01); *Y10T 74/18208* (2015.01)

(58) Field of Classification Search
CPC ........ F03B 13/12; F03B 13/14; F03B 13/141; F03B 13/148; F03B 13/16; F03B 13/18; F03B 13/1815; F03B 13/186; F03G 7/04; F03G 7/08; F16H 37/122; F16H 37/124
USPC ........ 60/495–500, 504, 506, 507; 290/42, 53; 185/30; 74/20, 21, 25–62, 89.16, 74/89.17, 89.2–89.22
See application file for complete search history.

(56) References Cited

U.S. PATENT DOCUMENTS

| 587,511 | A | * | 8/1897 | Schomberg ..................... 60/507 |
| 1,816,044 | A | | 7/1931 | Gallagher |
| 2,750,200 | A | | 7/1956 | Scheel |

(Continued)

FOREIGN PATENT DOCUMENTS

WO    2009046507    4/2009

*Primary Examiner* — Thomas Denion
*Assistant Examiner* — Laert Dounis

(57) ABSTRACT

A system and method for converting wave energy into electric energy in an intelligent, practical, and efficient manner. The system utilizes a power input shaft coupled with a vertically reciprocating buoy to rotate a crank gear and a ratchet gear meshing therewith. When the gears rotate, a plurality of generators coupled therewith produce electric energy. A flexible pivot device connects the power input shaft and the crank gear for absorbing impacts against the system from irregular and variable passing waves. The power input shaft is adjusted in response to water level fluctuations for maximum efficiency. A counterbalancing and maintenance device is coupled with the buoy to improve energy conversion efficiency and to uplift the buoy to a safe position in extreme conditions. An intelligent control system is included to monitor, control, and optimize the operations of the system.

15 Claims, 11 Drawing Sheets

(56) References Cited

U.S. PATENT DOCUMENTS

| | | | |
|---|---|---|---|
| 2,831,186 A * | 4/1958 | Delano, Jr. | 342/359 |
| 3,890,708 A * | 6/1975 | Bauer | 30/393 |
| 4,418,286 A * | 11/1983 | Scott | 290/42 |
| 6,612,152 B2 | 9/2003 | Keaton | |
| 6,831,374 B2 * | 12/2004 | Seki | 290/44 |
| 6,984,899 B1 | 1/2006 | Rice | |
| 7,830,030 B2 | 11/2010 | Altemark | |
| 8,093,736 B2 | 1/2012 | Raftery | |
| 2009/0072540 A1 * | 3/2009 | McCague et al. | 290/53 |

* cited by examiner

MOTION TRANSLATING ASSEMBLY AND A WAVE ENERGY GENERATION SYSTEM USING THE ASSEMBLY

CROSS-REFERENCE TO RELATED APPLICATIONS

The present invention claims priority from U.S. Provisional Patent Application No. 61/397,257 to Michael Fuquan Lee, filed on Jun. 9, 2010, and titled Wave Energy Power Plant, which is hereby incorporated in its entirety by reference.

BACKGROUND

Prior Art

Waves in oceans and lakes have great potential as an alternative energy source. Wave energy is clean, renewable, and vastly available. The estimated amount of wave energy available in U.S. alone is 2,100 terawatt-hours (TWh) per year, about one fourth of annual U.S. energy imports. To make wave energy useful, wave energy is transformed into other energy forms, usually electric energy.

Prior inventions for generating power from waves have provided apparatuses that often include a floating device, a gearing assembly, and an electric generating assembly. The floating device is connected to the gearing assembly such that when waves push the floating device the vertical motion of waves is converted into rotational motion of the gearing assembly. The gearing assembly is connected to the electric generating assembly such that the rotation of the gearing assembly drives the electric generating assembly to generate electric energy.

However, these apparatuses usually have three limitations. First, they are too fragile to use in real wave conditions. Wave directions are usually unpredictable. Variations of wave direction will cause unpredictable motion of the gearing assembly, which will result in extra wear and even breakage of the gearing assembly. Second, these apparatuses are inefficient in converting wave energy into electric energy. A substantial energy loss occurs each time the entire floating assembly is uplifted by wave action, leaving less energy for driving the gearing assembly and eventually being converted into electric energy. Also, these apparatuses are designed under the assumption of a fixed wave height and water level, resulting in inefficiency during the times when these assumptions are inevitably incorrect. Third, these apparatuses are prone to damage under severe wave and weather conditions from lack of protective means. Since the floating device is mechanically coupled with the gearing assembly, huge waves may damage the whole apparatus by causing the floating device to collide with the gearing assembly.

SUMMARY

The present invention is an intelligent control wave energy power generating system for converting wave energy into electric energy. In accordance with one embodiment, the intelligent control wave energy power generating system comprises (1) a buoy, (2) a platform assembly, (3) a motion translating assembly, (4) a threaded rod adjustment device, (5) a generator assembly, (6) a counterbalancing and maintenance device, (7) an intelligent control system, and (8) an openable cover.

The buoy floats on the water surface, and is coupled with a power input shaft in the motion translating assembly. The motion translating assembly also includes a gear transmission assembly coupled with the power input shaft to convert the vertical motion of the buoy via the power input shaft into the rotational motion of gears and a driveshaft. When the buoy reciprocates vertically in response to wave action, the driveshaft rotates and drives generators in the generator assembly to produce electric energy. The platform assembly is piled into the ocean or lake floor to support the rest of the system.

The threaded rod adjustment device raises or lowers a threaded rod, which constitutes the top part of the power input shaft, so that the buoy's vertical movement is within a predetermined range that allows the motion translating assembly to work properly and efficiently. When the water level rises due to daily tides, the threaded rod adjustment device, controlled by the intelligent control system, raises the threaded rod. Similarly, when the water level falls, the threaded rod adjustment device lowers the threaded rod. Because of the irregularity of wave directions, the waves may push the buoy in any horizontal direction, impacting the power input shaft coupled therewith. The motion translating assembly also includes a flexible pivot device connecting the power input shaft and the gear transmission assembly. The flexible pivot device absorbs any impact caused by wave-motion irregularity. This prevents the power input shaft from breaking and the gears in the gear transmission assembly from disengaging.

The counterbalancing and maintenance device is coupled with the buoy via a cable to improve the energy conversion efficiency and provide system protection under severe wave and weather conditions. It includes a counterweight that reciprocates vertically in the opposite direction of the buoy. When the waves uplift the buoy, they only need to overcome the weight difference between the buoy and the counterweight. Since the weight of the counterweight is slightly less than that of the buoy, energy lost in raising the buoy can be substantially reduced and more wave energy will be utilized for producing electric energy. The counterbalancing and maintenance device also includes an electric winch assembly and a counterweight lock. Under severe wave and weather conditions, the counterweight lock secures the counterweight and the electric winch assembly pulls the buoy up to a predetermined safe position.

The intelligent control system includes a plurality of sensors and meters and a control center. The sensors and meters collect operational information of the intelligent control wave energy power generating system and the environmental condition, and send that information to the control center. The control center continuously monitors the condition of the intelligent control wave energy power generating system and adjusts the system if necessary.

The present invention provides a novel and improved intelligent control wave energy power generating system, which overcomes the aforementioned limitations. The intelligent control wave energy power generating system comprises a set of novel devices, assemblies, and an intelligent control system to convert wave energy into electric energy. It provides a method to convert wave energy into electric energy efficiently, safely, and practically under various wave and weather conditions. It also includes a mechanism to protect itself under severe wave and weather conditions.

DRAWINGS

Figures

For a more complete understanding of the present invention, reference is now made to the following descriptions taken in conjunction with the following drawing, wherein.

Figure 1:
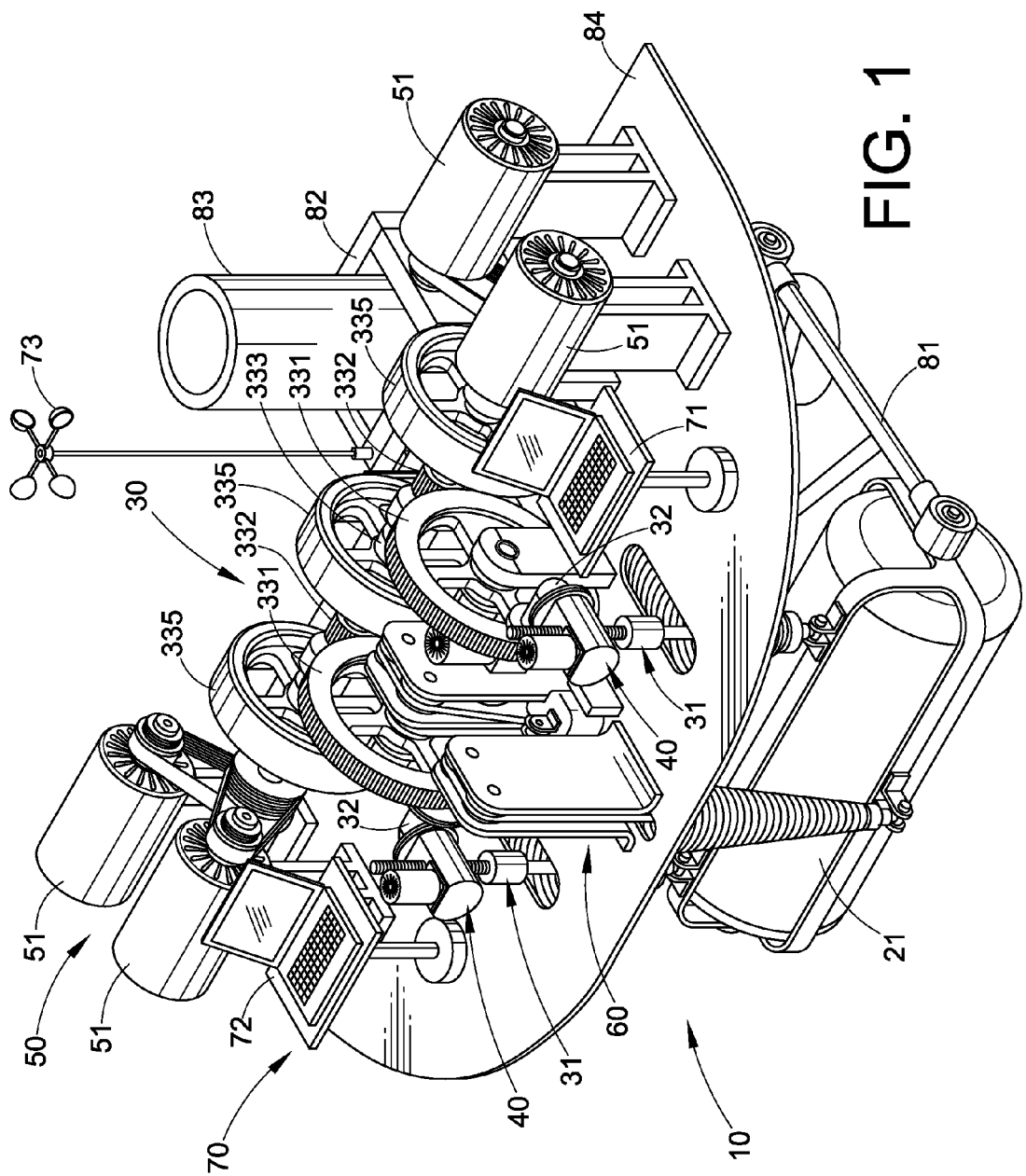
FIG. 1 depicts an embodiment of an intelligent control wave energy power generating system without its cover in accordance with the present invention.

REFERENCE NUMERALS 10 intelligent control wave energy power generating system
21 buoy
30 motion translating assembly
31 power input shaft
311 threaded rod
312 coupling
313 connecting rod
32 flexible pivot device
321 flexible joint
321A first flexible joint
321B second flexible joint
322 flexible joint housing
323 bushing
324 cover plate
325 bearing
326 washer
327 pivot pin
33 gear transmission assembly
331 crank gear
332 ratchet gear
333 driveshaft
334 pulley
335 flywheel
34 crank gear pedestal
35 driveshaft pedestal
40 threaded rod adjustment device
41 motor
42 adjustment device housing
43 gear shaft
44 drive gear
45 threaded driven gear
46 thrust bearing
50 generator assembly
51 generator
52 clutch pulley
521 clutch
53 belt
60 counterbalancing and maintenance device
61 cable
62 counterweight
63 counterweight lock
64 electric winch assembly
641 winch motor
642 gearbox
643 winch spool
644 movable pulley
645 fixed pulley
65 counterweight pedestal
70 intelligent control system
71 unit control center
72 group control center
73 anemoscope
74 speed sensor
75 position sensor
46 wattmeter
80 platform assembly
81 rack
82 mounting bracket
83 base column
84 mounting platform
85 connecting rod insulating cover
86 cable insulating cover
90 openable cover

DETAILED DESCRIPTION

One Embodiment—FIGS. 1-9

While the present invention is disclosed with reference to the embodiments described herein, it should be clear that the present invention should not be limited to such embodiment. Therefore, the description of the embodiments herein is only illustrative of the present invention and should not limit the scope of the invention as claimed.

The present invention provides an intelligent control wave energy power generating system 10 which generates electric energy from waves. One embodiment of the intelligent control wave energy power generating system 10 comprises a buoy or float 21, a motion translating assembly 30, a threaded rod adjustment device 40, a generator assembly 50, a counterbalancing and maintenance device 60, an intelligent control system 70, a platform assembly 80, and an openable cover 90.

FIG. 1 shows the intelligent control wave energy power generating system 10 without the openable cover 90. The buoy or float 21 floats on water surface. The buoy 21 is connected to the motion translating assembly 30. The motion translating assembly 30 includes a driveshaft 333 coupled with the generator assembly 50. When the buoy 21 reciprocates vertically in response to wave actions, the motion translating assembly 30 converts the vertical motion of the buoy 21 into the rotational motion of the driveshaft 333, driving the generator assembly 50 to generate electric energy.

The counterbalancing and maintenance device 60 is coupled to the buoy 21. In normal operation, the counterbalancing and maintenance device 60 reduces the weight the waves have to uplift, so more wave energy is used for generating electric energy. Under severe wave and weather conditions, the counterbalancing and maintenance device 60 pulls the buoy 21 up to a safe position.

Figure 2:
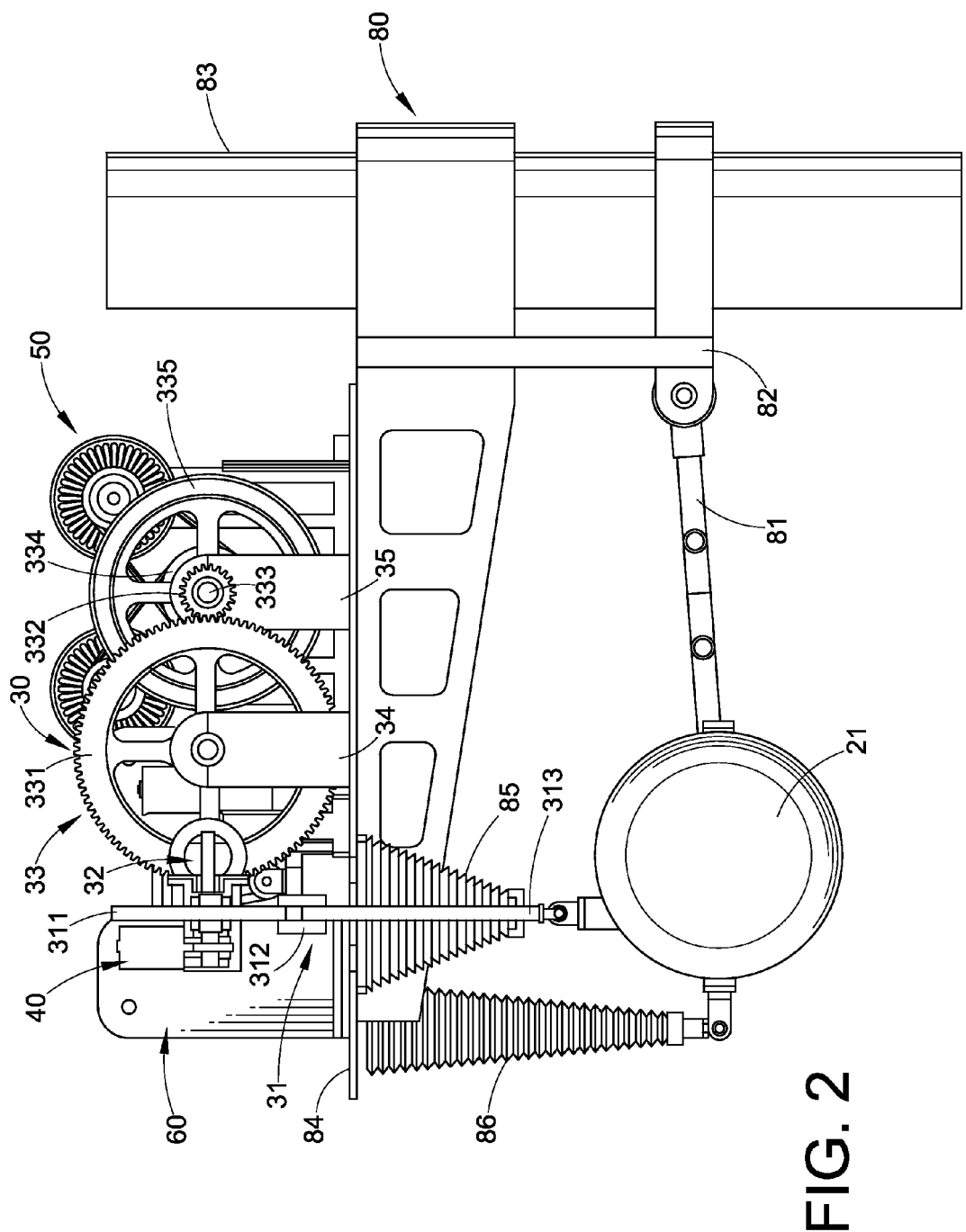
FIG. 2 is a side schematic section view of the intelligent control wave energy power generating system in FIG. 1.

FIG. 2 shows the buoy 21, the platform assembly 80, and the motion translating assembly 30. The platform assembly 80 comprises a rack 81, a mounting bracket 82, a base column 83, a mounting platform 84, a connecting rod insulation cover 85, and a cable insulation cover 86. The buoy 21 is connected to the base column 83 through the rack 81 and the mounting bracket 82. The base column 83 is permanently moored into the seabed or lakebed. The connection between the rack 81 and the mounting bracket 82 should be such that the buoy 21 can move up and down with the waves, for example, a double row sealed ball bearing. The mounting platform 84 is fastened to the base column 83 through the mounting bracket 82.

The motion translating assembly 30 comprises a gear transmission assembly 33 and a plurality of power input shafts 31, flexible pivot assemblies 32, crank gear pedestals 34, and driveshaft pedestals 35.

The buoy 21 is coupled with the power input shaft 31 through the rack 81. When the buoy 21 reciprocates vertically in response to wave actions, the power input shaft 31 moves vertically with the buoy 21. The power input shaft drives the gear transmission assembly 33 through the flexible pivot device 32.

As shown in FIG. 2, the power input shaft 31 comprises a threaded rod 311, a coupling 312, and a connecting rod 313. The threaded rod 311 is connected to the connecting rod 313 through the coupling 312, and the connecting rod 313 is coupled with the rack 81 to establish the connection between the buoy 21 and the threaded rod 311. The connection between the power input shaft 31 and the rack 81 is also shown in FIG. 1.

As shown in FIG. 2, the gear transmission assembly 33 comprises a driveshaft 333 and a plurality of crank gears 331, ratchet gears 332, pulleys 334, and flywheels 335. The flexible pivot device 32 connects the threaded rod 311 and the crank gear 331. The crank gear 331 is engaged with the ratchet gear 332. The ratchet gear 332, the flywheel 335, and the pulley 334 are mounted on the driveshaft 333. The pulley 334 is coupled with the generator assembly 50. The vertical motion of the power input shaft 31 rotates the crank gear 331, which drives the ratchet gear 332 to eventually turn the driveshaft 333. The ratchet gear 332 ensures that the driveshaft 333 rotates in one direction. The flywheel 335 keeps the driveshaft 333 rotating smoothly and uniformly. The driveshaft 333 then rotates the pulley 334, driving the generator assembly 50 to generate electric energy.

The crank gear 331 is moored to the mounting platform 84 through the crank gear pedestal 34. The driveshaft 333 is moored to the mounting platform 84 through the driveshaft pedestal 35.

As shown in FIG. 1, the mounting platform 84 supports the motion translating assembly 30, the generator assembly 50, the counterbalancing and maintenance mechanism 60, and the intelligent control system 70, which are all mounted on the mounting platform 84. All parts are above water except the buoy 21 that floats on water surface.

Figure 3:
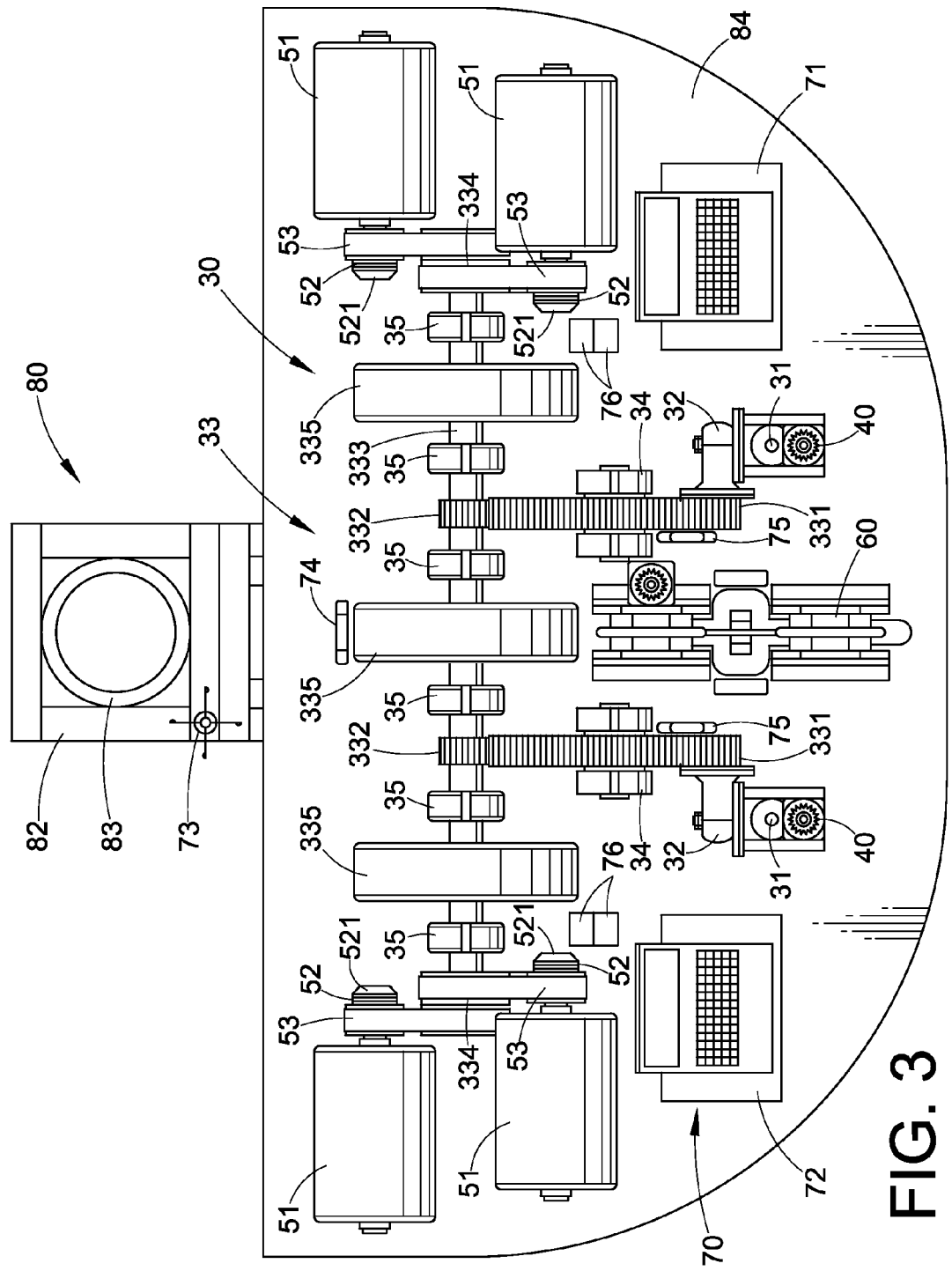
FIG. 3 is a top schematic view of the intelligent control wave energy power generating system in FIG. 1.

FIG. 3 shows one possible embodiment of the motion translating assembly 30, which comprises two power input shafts 31, two flexible pivot assemblies 32, two crank gear pedestals 34, six driveshaft pedestals 35, and the gear transmission assembly 33, which comprises two crank gears 331, two ratchet gears 332, two pulleys 334, three flywheels 335, and the driveshaft 333.

One power input shaft 31, one flexible pivot device 32, one crank gear 331, one ratchet gear 332, and one crank gear pedestal 34 are disposed on each side of the balance and maintenance mechanism 60, which is in the middle of the mounting platform 84. On each side, the power input shaft 31 is connected to the crank gear 331 through the flexible pivot device 32. The crank gear 331 is coupled with the ratchet gear 332, and moored to the mounting platform 84 through the crank gear pedestal 34. The flywheels 335, the ratchet gears 332, and the pulleys 334 are mounted on the driveshaft 333, which is moored to the mounting platform 84 through the six driveshaft pedestals 35. One flywheel 335 is placed in the middle of the driveshaft 333 and between the two ratchet gears 332. The other two flywheels 335 are placed equidistantly from the middle flywheel 335, one in each half of the driveshaft 333. One pulley 334 is placed on each end of the driveshaft 333. This placement keeps the load balanced for the driveshaft 333 and the mounting platform 84. Other embodiments are possible, for example, with one or two flywheels 335, or with two or four driveshaft pedestals 35.

Figure 4:
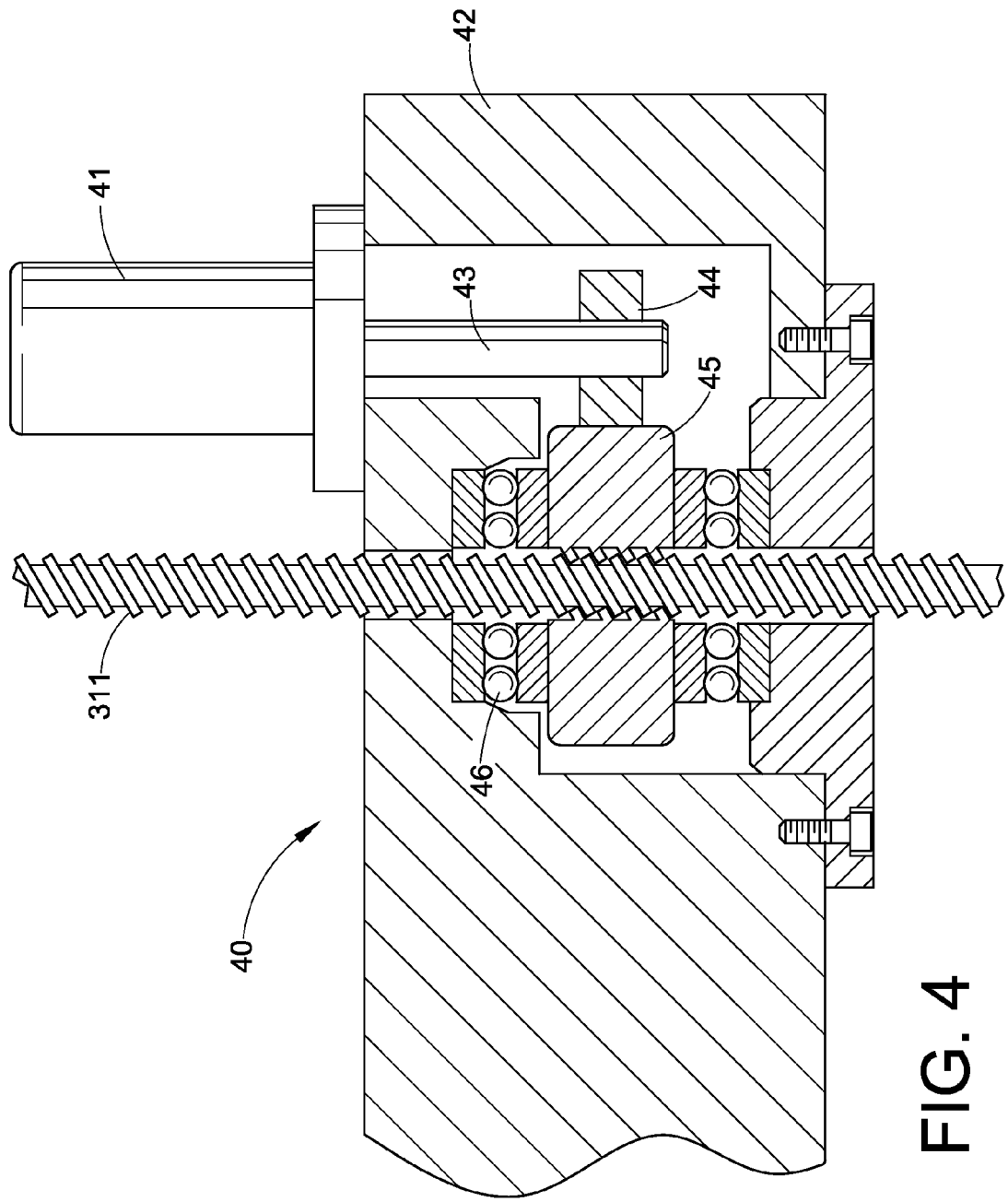
FIG. 4 is a schematic section view of an embodiment of a threaded rod adjustment device in accordance with the present invention.

FIG. 4 shows one embodiment of the threaded rod adjustment device 40. The threaded rod adjustment device 40 is mounted on the threaded rod 311. The threaded rod adjustment device 40 comprises a motor 41, an adjustment device housing 42, a gear shaft 43, a drive gear 44, a threaded driven gear 45, and a thrust bearing 46. The gear shaft 43, the drive gear 44, the threaded driven gear 45, and the thrust bearing 46 are housed inside the adjustment device housing 42. The motor 41 is mounted on top of the adjustment device housing 42. The motor 41 is coupled with the gear shaft 43. The drive gear 44 is mounted on the gear shaft 43 and is meshed with the threaded driven gear 45. The threaded driven gear 45 is meshed with the threaded rod 311. The threaded driven gear 45 is connected to the thrust bearing 46. The motor 41 drives the gear shaft 43, rotating the drive gear 44, and thus rotating the threaded driven gear 45. The rotation of threaded driven gear 45 then raises or lowers the threaded rod 311. The thrust bearing 46 maintain the position of the threaded driven gear 45.

Figure 5:
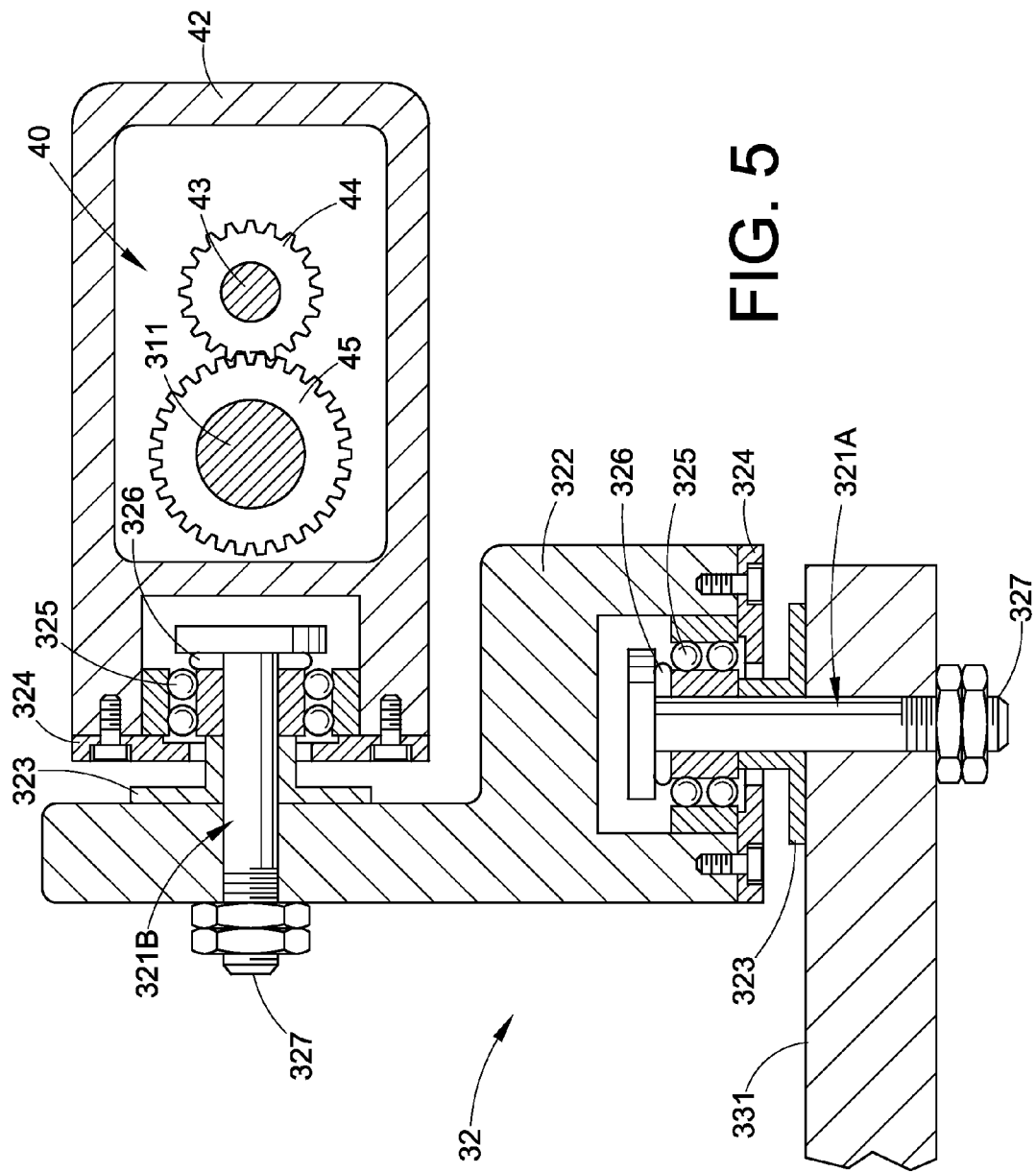
FIG. 5 is a schematic section view of an embodiment of a flexible pivot device in accordance with the present invention.

FIG. 5 shows the flexible pivot device 32. The flexible pivot device 32 comprises two flexible joints 321A, 321B and a flexible joint housing 322. The first flexible joint 321A is housed in the flexible joint housing 322 and mounted on the crank gear 331. The first flexible joint 321A translates the vertical motion of the threaded rod 311 into rotary motion of the crank gear 331. The second flexible joint 321B is mounted on the flexible joint housing 322, and is housed in the adjustment device housing 42, thus connecting to the threaded rod adjustment device 40. The second flexible joint 321B is connected to the threaded rod 311 through the threaded rod adjustment device 40.

Each flexible joint 321 comprises a bushing 323, a cover plate 324, a bearing 325, a washer 326, and a pivot pin 327. The bushing 323, the cover plate 324, the bearing 325, and the washer 326, are centered through the pivot pin 327. The pivot pin 327 of the flexible joint 321A is fastened on the crank gear 331. The pivot pin 327 of the flexible joint 321B is fastened on the flexible joint housing 322. The first flexible joint 321A can rotate relative to the crank gear 331. The second flexible joint 321B can rotate relative to the flexible joint housing 322. The two flexible joints 321A, 321B are perpendicular to each other.

The flexible pivot device 32 connects the threaded rod 311 to the crank gear 331. The threaded rod 311 turns the crank gear 331 through the flexible pivot device 32. Since the two flexible joints 321A, 321B are perpendicular to each other, the threaded rod 311 can turn at any angle along x-axis and y-axis without damaging the flexible pivot device 32 or the crank gear 331.

Figure 6:
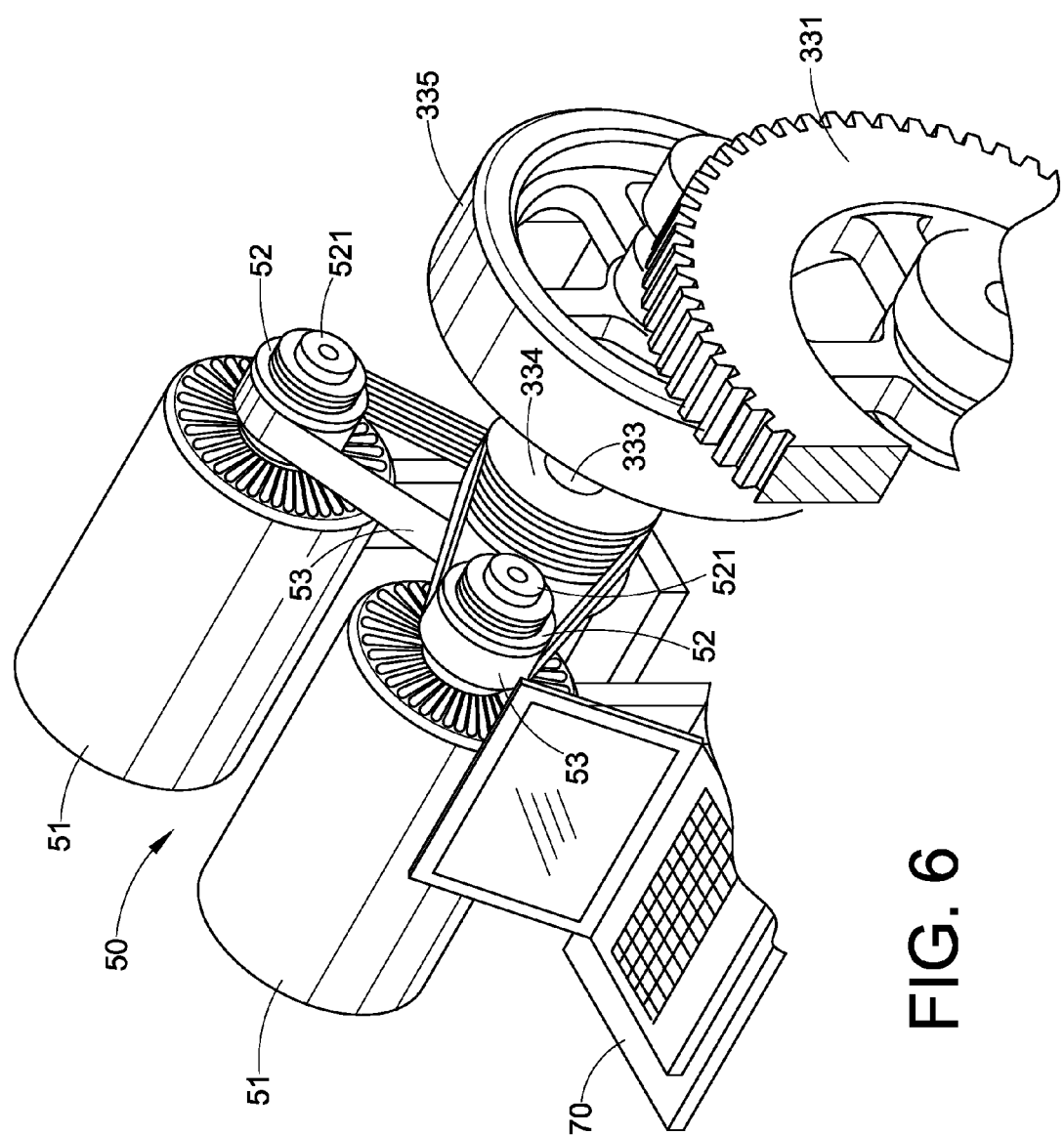
FIG. 6 is a schematic view of a generator assembly of the intelligent control wave energy power generating system in FIG. 1.
Figure 7:
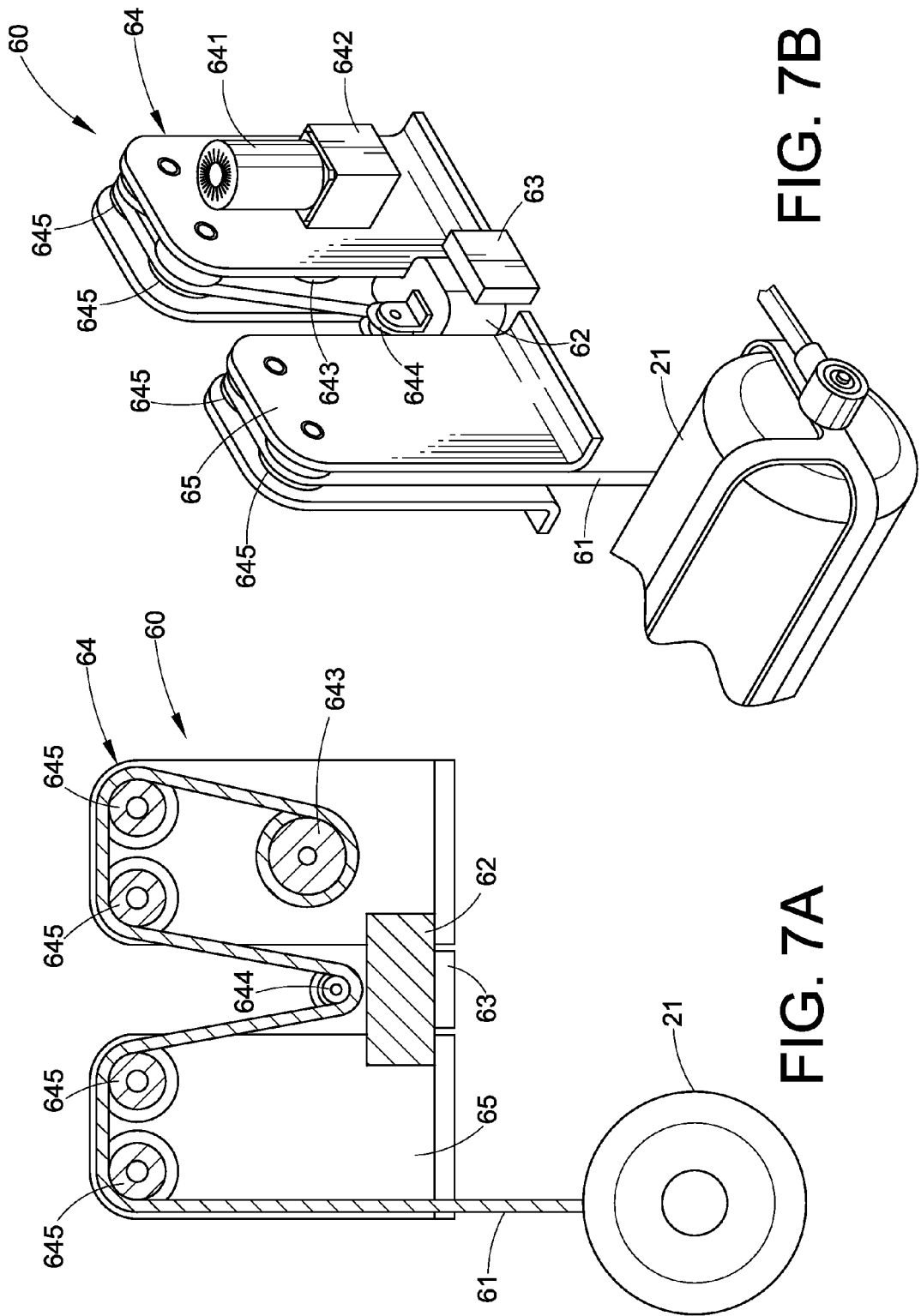
FIGS. 7A and 7B are schematic views of an embodiment of a counterbalancing and maintenance device in accordance with the present invention.

FIG. 6 shows the generator assembly 50. The generator assembly 50 comprises a plurality of generators 51, clutch pulleys 52, and belts 53. The clutch pulley 52 includes a clutch 521. The generator 51 is connected to the clutch pulley 52 which is coupled with the pulley 334 through the belt 53. The generator can be activated or deactivated by engaging or disengaging the clutch 521 in the clutch pulley 52. The power ratings of the generators 51 are predetermined such that their various combinations span a wide range of power output for various wave conditions.

One embodiment of the generator assembly 50 is shown in FIG. 3. The generator assembly 50 comprises four generators 51, four clutch pulleys 52, and four belts 53. Two generators 51, two clutch pulleys 52, and two belts 53 are coupled with the pulley 334 at each end of the driveshaft 333. Other embodiments are possible, e.g., using two generators 51, two clutch pulleys 52, and two belts 53.

FIGS. 7A and 7B show one embodiment of the counterbalancing and maintenance device 60. As shown in FIG. 7A, the counterbalancing and maintenance device 60 comprises a cable 61, a counterweight 62, a counterweight lock 63, an electric winch assembly 64, and a counterweight pedestal 65. As shown in FIG. 7B, the electric winch assembly 64 comprises a winch motor 641, a gearbox 642, a winch spool 643, a movable pulley 644, and a plurality of fixed pulleys 645. The cable 61 is connected to the buoy 21 on one end and tied to the winch spool 643 on the other end. The cable 61 winds through the fixed pulleys 645 and the movable pulley 644. The counterweight 62 is fastened to the movable pulley 644. The counterweight lock 63 and the electric winch assembly 64 are mounted on the counterweight pedestal 65. The winch motor 641 is coupled with the gearbox 642 which is coupled with the winch spool 643. The winch motor 641 drives the gearbox 642 to spin the winch spool 643. The winch spool 643 spins to tighten or loosen the cable 61, moving up or down the buoy 21, respectively.

FIG. 3 shows one embodiment of the intelligent control system 70. The intelligent control system 70 comprises a unit control center 71, a group control center 72, an anemoscope 73, a speed sensor 74, two position sensors 75, and four wattmeters 76. The anemoscope 73 is mounted on the mounting bracket 82. The speed sensor 74 is disposed next to the middle flying wheel 335. The position sensors 75 are disposed next to the crank gears 331 and one position sensor 75 is used for one crank gear 331. The wattmeters 76 are linked to the generators 51, and one wattmeter 76 is used for one generator 51. The sensors and meters, comprising of the anemoscope 73, the speed sensor 74, the two position sensors 75, and the four wattmeters 76, are linked to the unit control center 71. The unit control center 71 is linked to the group control center 72. The intelligent control system 70 is mounted on the mounting platform 84. The link between the wattmeters 76 and the generators 51, the links between the sensors and meters and unit control center 71, and the link between the unit control center 71 and the group control center 72 are not shown in FIG. 3.

As shown in FIG. 2, the part of the connecting rod 313 below the mounting platform 84 is protected by an anti-corrosion connecting rod insulating cover 85. The part of the cable 61, which is not shown in FIG. 2, below the mounting platform 84 is also protected by an anti-corrosion cable insulating cover 86. The buoy 21, the connecting rod 313, the rack 81, the mounting bracket 82, and the bottom side of the mounting platform 84 are made of anti-corrosion materials, or their surfaces are treated with anti-corrosion treatment.

The intelligent control wave energy power generating system 10 can be multiplied and assembled to form a power plant. The power plant may comprise one or multiple independent intelligent control wave energy power generating systems 10. The number of the intelligent control wave energy power generating systems 10 in the power plant is dependent on the wave condition and expected power output.

Figure 8:
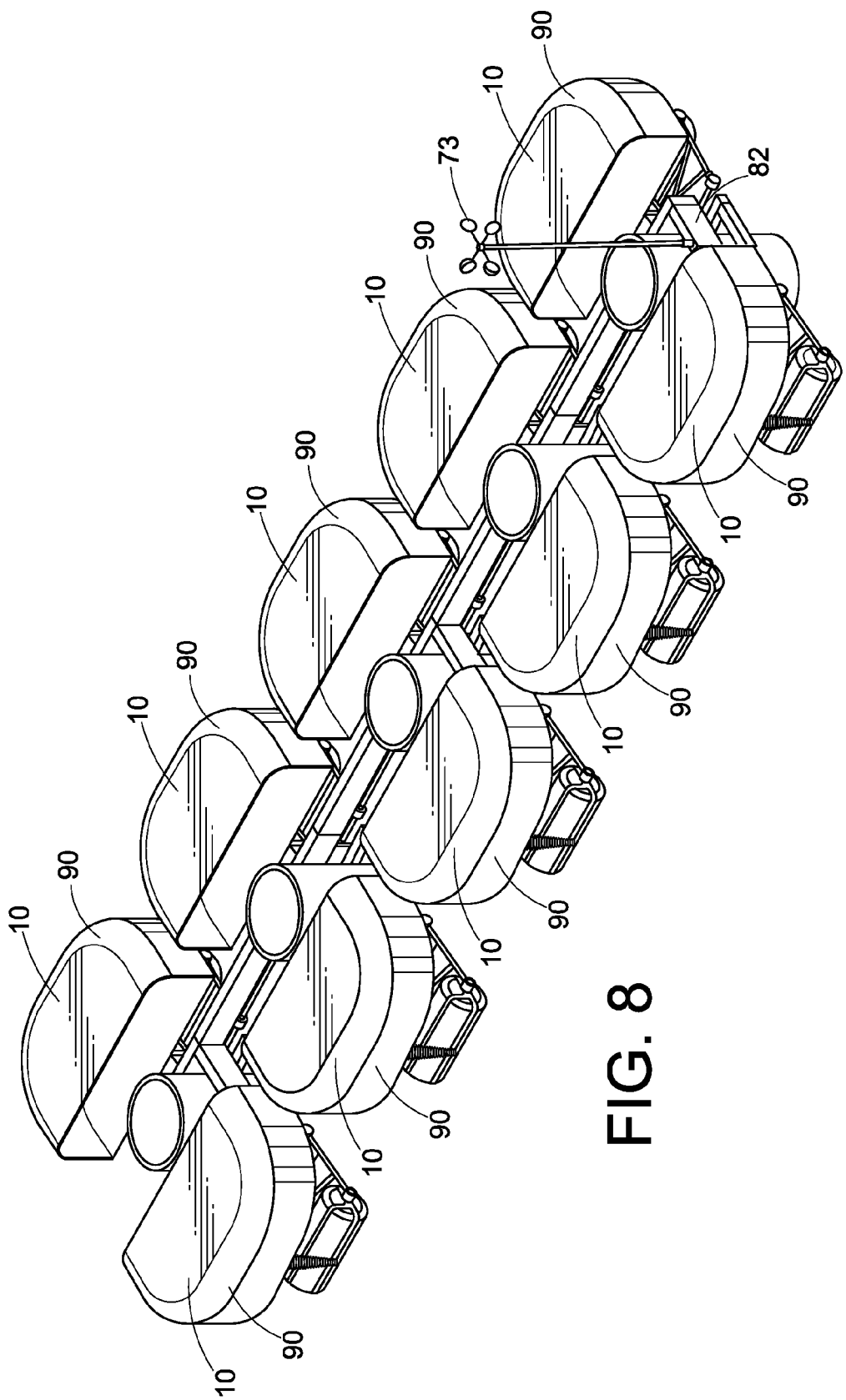
FIG. 8 is a schematic view of an embodiment of a power plant with ten intelligent control wave energy power generating systems in accordance with the present invention.

FIG. 8 shows an embodiment of the power plant with ten intelligent control wave energy power generating systems 10. Other embodiments are possible, for example, with one or one hundred intelligent control wave energy power generating systems 10. As shown in FIG. 8, each intelligent control wave energy power generating system 10 has an openable anti-corrosion cover 90.

Figure 9:
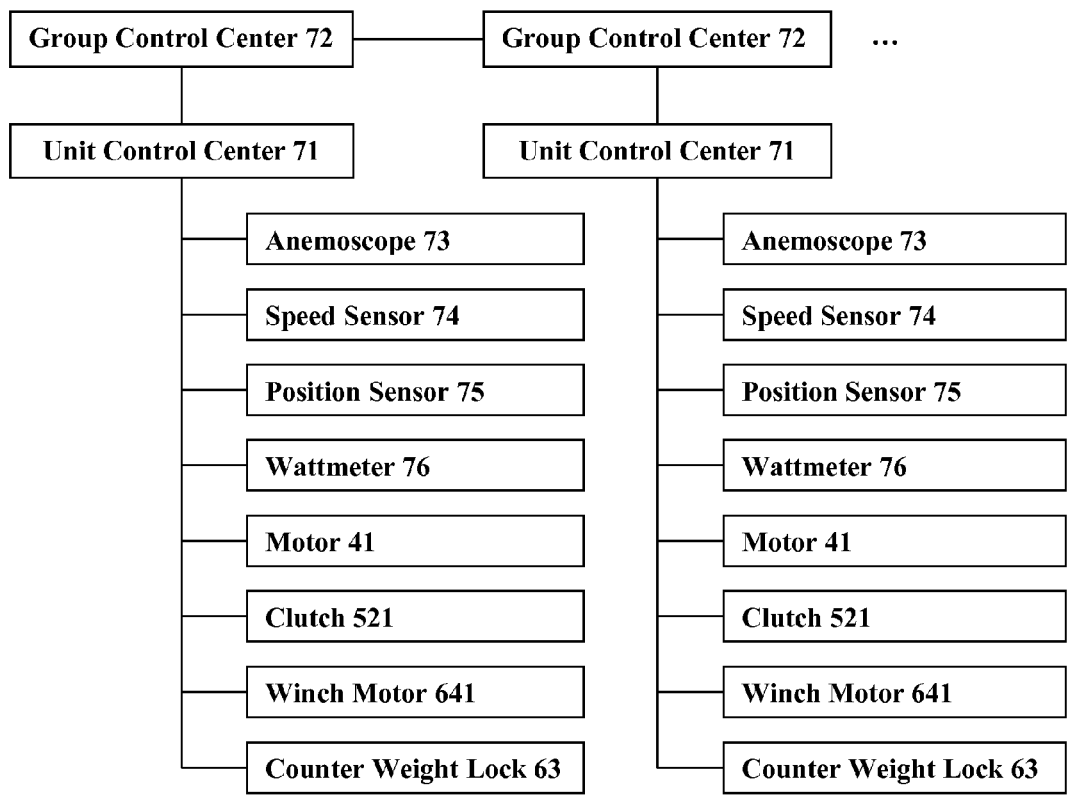
FIG. 9 is a schematic illustration of a control mechanism of the intelligent control wave energy power generating system in FIG. 1.

The control mechanism of the power plant is illustrated in FIG. 9. The group control center 72 coordinates and controls the unit control center 71. The unit control center 71 controls the anemoscope 73, the speed sensor 74, the position sensor 75, the wattmeters 76, the motor 41, the clutches 521, the winch motor 641, and the counterweight lock 63. When there is only one intelligent control wave energy power generating system 10 in the power plant, the group control center 72 may be removed. When there are two or more intelligent control wave energy power generating systems 10 in the power plant, the group control centers 72 of the intelligent control wave energy power generating systems 10 are connected.

Operation

One Embodiment—FIGS. 1-6, 10-11

We discuss the normal operation as well as the adjustment, maintenance and safety of the intelligent control wave energy power generating system 10.

Normal Operation

As shown in FIG. 1, in the normal operation of the intelligent control wave energy power generating system 10, the motion translating assembly 30 converts the vertical motion of the buoy 21, produced in response to wave actions, into the rotational motion of the driveshaft 333. The driveshaft 333 drives the generator 51 to generate electric energy, which is sent ashore.

Motion Translation

As shown in FIG. 2, when the waves rise, uplifting the buoy 21 and the threaded rod 311, the threaded rod 311 turns the crank gear 331 upward through the flexible pivot device 32 such that the vertical motion of the threaded rod 311 is converted into the rotary motion of the crank gear 331. The crank gear 331 rotates the ratchet gear 332, which drives the driveshaft 333. The driveshaft 333 rotates the pulley 334 and the flywheel 335. As shown in FIG. 6, the pulley 334 drives the clutch pulley 52 through the belt 53. The clutch pulley 52 drives the generator 51 to generate electric energy.

As shown in FIG. 2, when the waves recede, dropping the buoy 21 and the threaded rod 311, the flexible pivot device 32 again converts the vertical motion of the threaded rod 311 into the rotary motion of the crank gear 331, turning the crank gear 331 downward. However, the ratchet gear 332 is not engaged and does not rotate with the crank gear 331. Therefore, when the waves recede, the driveshaft 333 continues to rotate in the same direction, because of momentum and the torque of the flywheel 335. In other words, the driveshaft 333 always rotates in one direction and keeps driving the generator assembly 50 to continuously produce electric energy.

In summary, the rise and fall of the waves causes the buoy 21 and the threaded rod 311 to move up and down, resulting in the rotary reciprocation of the crank gear 331. The ratchet gear 332 converts the rotary reciprocation of the crank gear 331 into the rotational motion of the driveshaft 333, which drives the generator 51 to generate electric energy.

As shown in FIG. 2, when the waves rise, the threaded rod 311 rotates the crank gear 331 clockwise through the flexible pivot device 32. The crank gear 331 drives the ratchet gear 332 to rotate counterclockwise. The ratchet gear 332 drives the driveshaft 333 and the flywheel 335 to rotate in the same direction, that is, counterclockwise. When the waves recede, dropping the buoy 21 and the threaded rod 311, the threaded rod 311 rotates the crank gear 331 counterclockwise. However, the ratchet gear 332 prevents the driveshaft 333 from rotating with the crank gear 331. The driveshaft 333 continues to rotate counterclockwise because of its momentum and the torque of the flywheel 335. Therefore, the driveshaft 333 always rotates counterclockwise.

Figure 10:
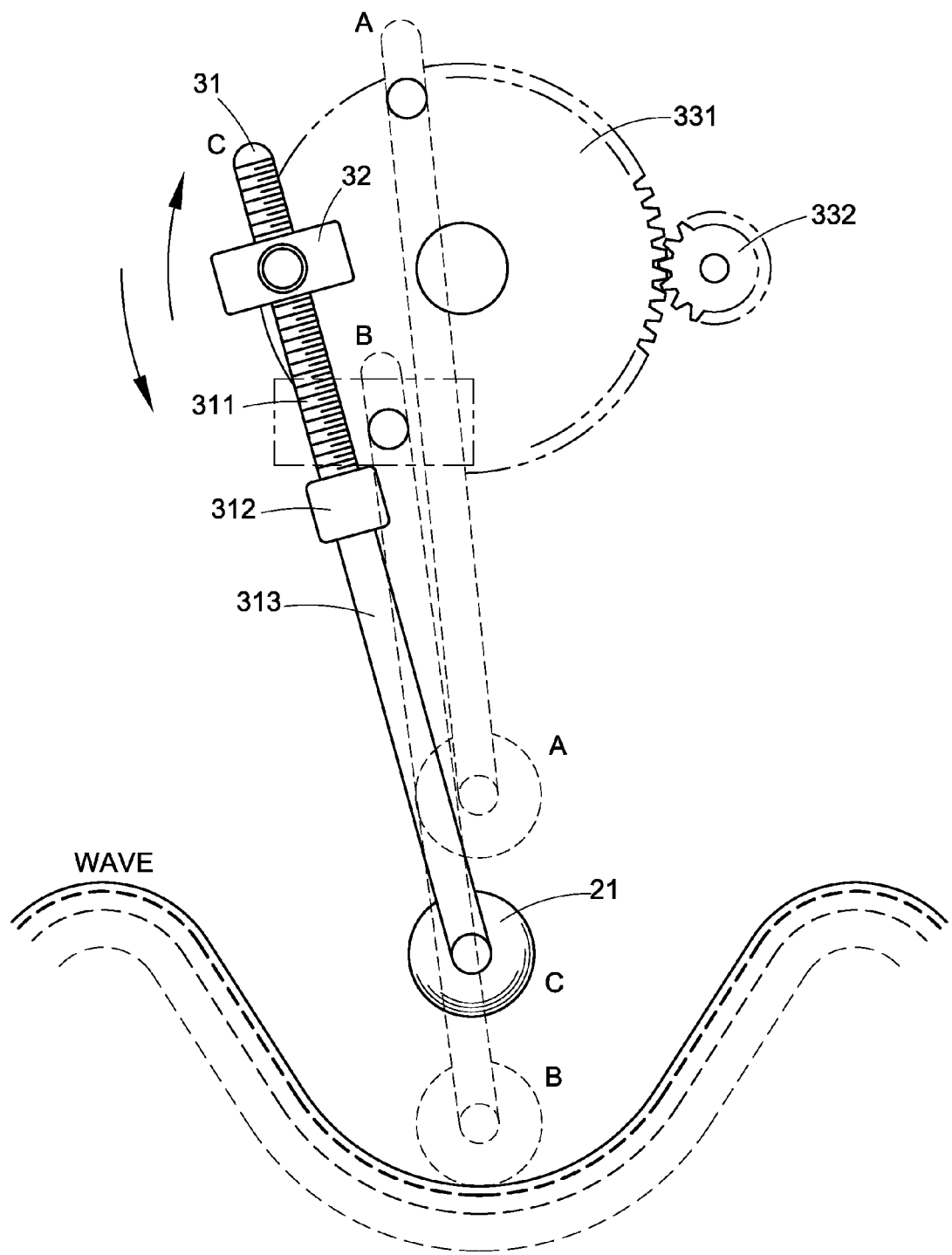
FIG. 10 is a schematic illustration demonstrating the operations of a power input shaft, a threaded rod adjustment device, and a crank gear, of the intelligent control wave energy power generating system in FIG. 1.

As shown in FIG. 10, in normal operation, the crank gear 331 rotates reciprocally between two positions: a high position A and a low position B. The crank gear 331 reaches the high position A at the peak of the waves. The crank gear 331 reaches the low position B at the trough of the waves. The position of the crank gear 331 can be defined by the position of the flexible pivot device 32, as shown in FIG. 10. In FIG. 10, the high position A shows the flexible pivot device 32 at eleven thirty o'clock, and the low position B shows the flexible pivot device 32 at six thirty o'clock. There is also a middle position C where the flexible pivot device 32 is at nine o'clock when the buoy 21 is at the water level. In the remaining part of the detailed description, we will use the position of the flexible pivot device 32 to indicate the position of the crank gear 331. For example, when we say the crank gear 331 is at nine o'clock, it means that the flexible pivot device 32 is at nine o'clock.

As shown in FIG. 5, in addition to converting the vertical motion of the threaded rod 311 into the rotary reciprocation of the crank gear 331, the flexible pivot device 32 also converts the horizontal motion of the threaded rod 311 into the rotational motion of the flexible joints 321A, 321B. The first flexible joint 321A can rotate relative to the crank gear 331. The second flexible joint 321B can rotate relative to the first flexible joint 321A. The two flexible joints 321A and 321B are perpendicular to each other. Together they allow the threaded rod 311 to turn at any angle along x-axis and y-axis without damaging the flexible pivot device 32 or the crank gear 331. Since the wave directions are unpredictable, they can cause the threaded rod 311 to turn at an arbitrary angle along x-axis and y-axis. The flexible pivot device 32 accommodates such horizontal motion of the threaded rod 311.

Counterbalancing

Figure 11:
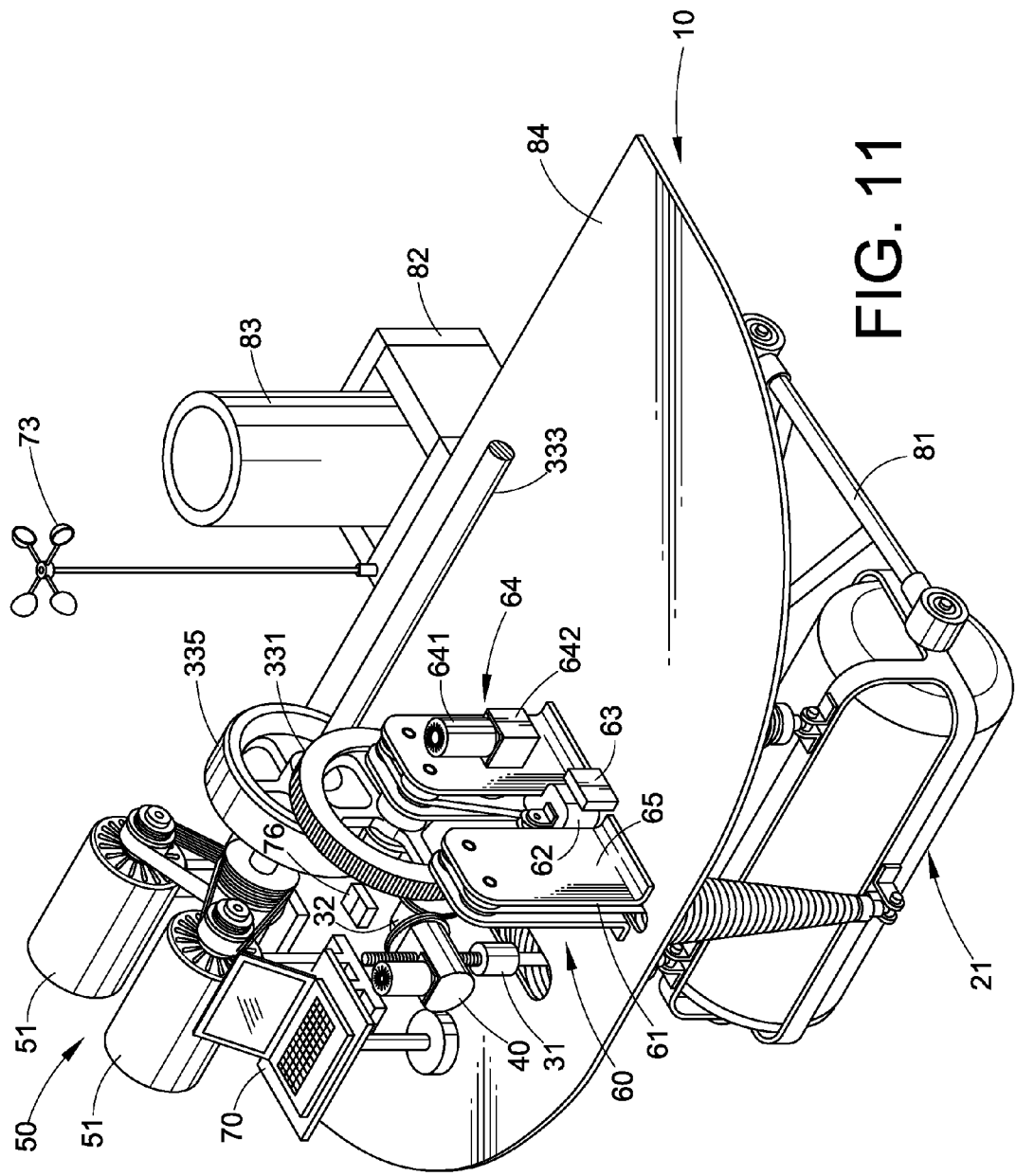
FIG. 11 is a schematic view depicting the operations of an intelligent control system of the intelligent control wave energy power generating system in FIG. 1 in severe wave and weather conditions.

As shown in FIG. 11, the counterweight 62 moves up and down in the opposite direction of the buoy 21. The counterweight 62 is slightly lighter than the lifting load, which comprises the parts the waves have to uplift, including the buoy 21, the power input shaft 31, the threaded rod adjustment device 40, and the flexible pivot device 32. When the waves push the lifting load up, the counterweight 62 moves down, thus reducing the weight the waves have to uplift. With the counterweight 62, the waves can push the buoy 21 and the power input shaft 31 higher, turning the crank gear 331 a larger angle, and rotating the driveshaft 333 faster. Therefore, less wave energy is used for uplifting the lifting load, and more wave energy is used for rotating the driveshaft 333 and generating electric energy. When the waves recede, the gravity drags the buoy 21 down because the lifting load is heavier than the counterweight 62.

For example, suppose the total weight of lifting load, including the buoy 21, the power input shafts 31, the threaded rod adjustment devices 40, and the flexible pivot assemblies 32, is 500 kg, the counterweight is 400 kg, and the uplifting capacity of the waves is 1000 kg. Without the counterweight 62, the waves have to spend 500 kg to uplift the lifting load, leaving 500 kg for driving the driveshaft 333 to generate electric energy. With the counterweight 62, the waves need to spend just 100 kg (500 kg-400 kg) to uplift the lifting load, leaving 900 kg for driving the driveshaft 333 to generate electric energy.

Therefore, the counterbalancing and maintenance device 60 increases the wave energy used to drive the driveshaft 333 and the generator assembly 50 to generate electric energy. The counterbalancing and maintenance device 60 improves the energy conversion efficiency of the intelligent control wave energy power generating system 10.

Adjustment, Maintenance, and Safety

The intelligent control system 70 monitors the state of the intelligent control wave energy power generating system 10 through the sensors and meters, including the anemoscope 73, the speed sensor 74, the position sensor 75, and the wattmeter 76. Based on the feedback of the sensors and meters, the unit control center 71 can raise or lower the threaded rod 311 through the threaded rod adjustment device 40 and activate or deactivate the generator 51, to improve the energy conversion efficiency. The intelligent control system 70 can also uplift the buoy 21 and shut down the intelligent control wave energy power generating system 10 in severe wave and weather conditions.

Threaded Rod Adjustment

FIG. 10 illustrates the rotary reciprocation of the crank gear 331. As described above, the crank gear 331 rotates reciprocally in a region between the high position A and the low position B, which is the rotating region of the crank gear 331. As shown in FIG. 10, when the waves rise from their troughs to their peaks, uplifting the buoy 21, the crank gear 331 turns from the low position B at six thirty o'clock, passing the middle position C at nine o'clock, to the high position A at eleven thirty o'clock. When the waves recede from their peaks to their troughs, dropping the buoy 21, the crank gear 331 turns from eleven thirty o'clock, passing nine o'clock, to six thirty o'clock.

The high position A and the low position B, and hence the rotating region of the crank gear 331, is determined by the wave height, the water level, and the distance between the flexible pivot device 32 and the buoy 21. The crank gear 331 should be at nine o'clock when the buoy 21 is at the water level, which means its rotating region should be centered at nine o'clock. For any given wave height, such rotating region maximizes wave energy output. Furthermore, such rotating region maximally excludes the two positions the crank gear 331 must avoid, i.e., the twelve o'clock and the six o'clock. The crank gear 331 would be stuck at these two positions and the waves would move the buoy 21 to crush the flexible pivot device 32. For a specific wave height, the desirable rotating region is centered at nine o'clock.

However, due to fluctuations of the water level, the crank gear 331 may not rotate reciprocally in the desirable rotating region. The actual rotating region may be different from the desirable rotating region. The intelligent control system 70 monitors the rotating region of the crank gear 331 through the position sensor 75. Based on the feedback of the position sensor 75, the intelligent control system 70 determines the difference between the desirable rotating region and the actual rotating region. If the intelligent control system 70 decides that the difference is big enough, it requests the threaded rod adjustment device 40 to raise or lower the threaded rod 311 to change the distance between the flexible pivot device 32 and the buoy 21, so that the actual rotating region will match the desirable rotating region. A longer distance between the flexible pivot device 32 and the buoy 21 turns the rotating region clockwise. A shorter distance between the flexible pivot device 32 and the buoy 21 turn the rotating region counterclockwise.

For example, if the desirable rotating region of the crank gear 331 is between ten o'clock and eight o'clock, and the actual rotating region is between nine o'clock and seven o'clock, the threaded rod 311 is raised to increase the distance between the flexible pivot device 32 and the buoy 21, thus turning the rotating region of the crank gear 331 clockwise to be between ten o'clock and eight o'clock. With the threaded rod adjustment device 40, the intelligent control system 70 can accommodate the fluctuations in the water level caused by tidal or seasonal changes, and keep the rotating region of the crank gear 331 close to the desirable rotating region.

The operations of the threaded rod adjustment device 40 can be described using FIG. 4. The threaded rod adjustment device 40 rotates the threaded rod 311 to adjust the distance between the flexible pivot device 32 and the buoy 21 which are not shown in FIG. 4. The motor 41 drives the gear shaft 43. The gear shaft 43 rotates the drive gear 44, driving the threaded driven gear 45. Since the thrust bearing 46 is fastened to the adjustment device housing 42, the vertical motion of the threaded driven gear 45 is restrained by the thrust bearing 46. The threaded driven gear 45 does not move vertically as it rotates, but causes the threaded rod 311 to move up or down. The motor 41 can drive the gear shaft 43, the drive gear 44, and the threaded driven gear 45 to rotate either clockwise or counterclockwise, raising or lowering the threaded rod 311.

Generator Activation

The power ratings of the generators 51 are predetermined such that when the power ratings of the generators 51 are sorted in increasing order, the power rating of a later generator 51 exceeds the total power rating of the previous generators 51. One embodiment of the generator assembly 50 is shown in FIG. 3 with four generators 51. We denote the four generators 51 as generators G1, G2, G3, and G4, in increasing order of their power ratings. In other words, the power rating of the generator G4 is larger than the total power rating of the generators G1, G2, and G3; the power rating of the generator G3 is larger than the total power rating of the generators G1 and G2; and the power rating of the generator G2 is larger than the power rating of the generator G1.

Based on historical wave data, wave energies are divided into fifteen levels. When wave energies exceed level fifteen, the wave conditions are deemed severe and the intelligent control system 70 will shut down all generators 51. The four generators G1, G2, G3, and G4, are activated based on the level of wave energy. Table 1 shows the relationship between the generator activation and the wave energy level.

TABLE 1

Relationship between wave energy level and generator activation.

| Wave Energy up to Level | Generator(s) Activated |
|---|---|
| 1 | G1 |
| 2 | G2 |
| 3 | G2 + G1 |
| 4 | G3 |
| 5 | G3 + G1 |
| 6 | G3 + G2 |
| 7 | G3 + G2 + G1 |
| 8 | G4 |
| 9 | G4 + G1 |
| 10 | G4 + G2 |

TABLE 1-continued

Relationship between wave energy level and generator activation.

| Wave Energy up to Level | Generator(s) Activated |
|---|---|
| 11 | G4 + G2 + G1 |
| 12 | G4 + G3 |
| 13 | G4 + G3 + G1 |
| 14 | G4 + G3 + G2 |
| 15 | G4 + G3 + G2 + G1 |

The combination of the generators 51 allows the generator assembly 50 work in a wider range of wave energy than a single generator. With a single generator, it will be damaged if the waves are too strong, or will not run if the waves are too weak. The combination of the generators 51 allows the intelligent control system 70 achieve appropriate power rating for the current wave energy level. Based on the feedback of the speed sensor 74 and the wattmeters 75, the intelligent control system 70 decides how many generators 51 to activate. The intelligent control system 70 may activate one, two, three, or four generators 51.

As shown in FIG. 6, the generator 51 is activated by engaging the clutch 521 of the clutch pulley 52 connected to the generator 51. To deactivate the generator 51, the clutch 521 of the clutch pulley 52 connected to the generator 51 is disengaged.

Maintenance and Safety

The intelligent control system 70 analyzes the feedback from the anemoscope 73, the speed sensor 74, and the wattmeters 76 to determine if the intelligent control wave energy power generating system 10 is working properly or is able to work properly under current wave and weather condition. If the intelligent control system 70 determines that the intelligent control wave energy power generating system 10 should be shut down due to its condition or the wave or weather condition, the intelligent control system 70 coordinates the counterbalancing and maintenance device 60 and the threaded rod adjustment device 40 to pull the buoy 21 up to a predetermined safe position. The intelligent control system 70 also stops the generators 51 to shut down the intelligent control wave energy power generating system 10.

During the maintenance of the intelligent control wave energy power generating system 10, the buoy 21 is uplifted to a predetermined position for cleaning, repairing, and so on.

As shown in FIG. 11, to uplift the buoy 21, the intelligent control system 70 locks the counterweight 62 to the mounting platform 84 using the counterweight lock 63. The intelligent control system 70 then coordinates the electric winch assembly 64 and the threaded rod adjustment device 40 to uplift the buoy 21 to a predetermined position for maintenance or safety.

CONCLUSION, RAMIFICATIONS, AND SCOPE

Therefore, the reader will see that, according to one embodiment of the invention, I have provided the intelligent control wave energy power generating system.

While the above description contains many specificities, these should not be construed as limitations on the scope of any embodiment, but as exemplifications of various embodiments thereof. Many other ramifications and variations are possible within the teachings of the various embodiments. For example, another embodiment of the gear transmission assembly 33 may include a crank gear and a ratchet gear connected by belts or chains.

Thus the scope should be determined by the appended claims and their legal equivalents, and not by the examples given.

What is claimed is:

1. A system for wave energy generation for use above water, comprising:
    a platform assembly above the water;
    a buoy;
    a motion translating assembly coupled with said buoy for translating vertical motion into rotational motion, comprising:
        at least one power input member coupled with said buoy; and
        a gear transmission assembly coupled with said power input member, comprising at least one crank gear; and
        at least one flexible pivot device connecting said power input member to said crank gear, wherein said flexible pivot device comprises a first flexible joint housed in a flexible joint housing including a pivot pin mounted on said crank gear, and a second flexible joint including a pivot pin mounted on the flexible joint housing and connected to said power input member; wherein the first and second flexible joints are coupled perpendicular to each other; and said first flexible joint being able to freely turn at any angle relative to said crank gear and said second flexible joint being able to freely turn at any angle relative to said first flexible joint; and
    a plurality of generators coupled with said gear transmission assembly and stationed on said platform assembly such that rotational motion within said gear transmission assembly results in said generators generating electric energy;
    whereby said system will be powered by irregular, unpredictable, and variable wave actions from all directions.

2. The system of claim 1, wherein said power input member is threaded.

3. The system of claim 1, wherein said gear transmission assembly further comprises at least one ratchet gear meshing with said crank gear or synchronously driven by said crank gear and mounted on a driveshaft, at least one flywheel mounted on said driveshaft, and at least one pulley mounted on said driveshaft, said driveshaft coupled with said generators to provide driving force thereto.

4. The system of claim 1, wherein said motion translating assembly further comprises at least one threaded rod adjustment device mounted on said power input member, comprising an electric motor, a drive gear propelled by said electric motor, and a threaded driven gear engaged with said drive gear and mounted on said power input member to drive said power input member upward or downward in response to water level fluctuations.

5. The system of claim 4, further comprising an intelligent control system connected with said motion translating assembly, and said plurality of generators for collecting and processing information of environmental and said system's conditions from a plurality of sensors and meters, determining directives, and transmitting directives;
    wherein said threaded rod adjustment device is controlled by said intelligent control system to adjust a length of a part of said power input member between said threaded rod adjustment device and said buoy such that said crank gear rotates reciprocally within a predetermined desirable region.

6. The system of claim 1, further comprising a counterbalancing and maintenance device coupled with said buoy and stationed on said platform assembly, comprising a counterweight connected to said buoy via a connecting means, said counterweight having less weight than a predetermined lifting load and reciprocating vertically in the opposite direction of said buoy such that wave energy lost in uplifting said buoy will be minimized and wave energy converted will be maximized; and
    an intelligent control system connected with said motion translating assembly, said counterbalancing and maintenance device, and said plurality of generators for collecting and processing information of environmental and said system's conditions from a plurality of sensors and meters, determining directives, and transmitting directives;
    wherein said counterbalancing and maintenance device further comprises a counterweight lock and an electric winch assembly, said counterweight lock is attached to said counterweight, and said electric winch assembly connects to said connecting means and controlled by said intelligence control system such that when a predetermined extreme wave and weather condition has been detected by said intelligence control system, said counterweight lock will secure said counterweight and said electric winch assembly will uplift said buoy to a predetermined safe position.

7. The system of claim 1, wherein each of said plurality of generators has a distinct predetermined power rating and will work independently or in logical combination according to directives received from said intelligent control system in response to variable wave energy levels.

8. The system of claim 1, wherein said platform assembly comprises at least one supporting column piled into the seabed, said supporting column supports a mounting platform with space for said motion translating assembly, and said plurality of generators, and also supports a rack coupled with said buoy beneath said mounting platform for restraining said buoy within a predetermined moving area.

9. The platform assembly of claim 8, wherein said rack is coupled with said power input member.

10. The system of claim 1, further comprising an intelligent control system connected with said motion translating assembly, and said plurality of generators for collecting and processing information of environmental and said system's conditions from a plurality of sensors and meters, determining directives, and transmitting, directives;
    wherein said plurality of sensors and meters comprises a plurality of wattmeters for each of said plurality of generators, at least one anemoscope, at least one speed sensor, and at least one position sensor for said crank gear.

11. The system of claim 1, wherein said system can be multiplied and seamlessly assembled together, each of said multiplied systems having its own unit control center and also controlled in whole by a group control center.

12. A system for wave energy power generating above the water, comprising:
    a flotation means for responding to wave action;
    a motion translating means coupled with said flotation means for translating vertical motion into rotational motion, comprising:
        at least one power input member coupled with said flotation means to reciprocate vertically with said flotation means;
        at least one gear transmission means comprising at least one crank gear coupled with said power input member; and
        at least one flexible pivot device connecting said power input member to said crank gear, wherein said flexible pivot device comprises a first flexible joint housed in a flexible joint housing including a pivot pin mounted on said crank gear, and a second flexible joint including a pivot pin mounted on the flexible joint housing and connected to said power input member; wherein the first and second flexible joints are coupled perpendicular to each other; and said first flexible joint being able to freely turn at any angle relative to said crank gear and said second flexible joint being able to freely turn at any angle relative to said first flexible joint;

a power generating means coupled with and powered by said motion translating means; and a supporting means for providing above water space and support for said motion translating means and said power generating means;

whereby said system will be safely powered by irregular, unpredictable, and variable wave actions from all directions.

13. The system of claim 12 further comprising at least one adjustment means for adjusting a length of a part of said power input member to enable said crank gear to rotate reciprocally within a predetermined desirable region, comprising an electric motor, a first gear propelled by said electric motor, a second threaded gear engaged with said first gear and mounted on said power input member to drive said power input member upward or downward.

14. A motion translating assembly for translating vertical motion into rotational motion, comprising:

at least one power input member; and at least one gear transmission means comprising at least one crank gear coupled with said power input member; and at least one flexible pivot device connecting said power input member to said crank gear, wherein said flexible pivot device comprises a first flexible joint housed in a flexible joint housing including a pivot pin mounted on said crank gear, and a second flexible joint including a pivot pin mounted on the flexible joint housing and connected to said power input member; wherein the first and second flexible joints are coupled perpendicular to each other; and said first flexible joint being able to freely turn at any angle relative to said crank gear and said second flexible joint being able to freely turn at any angle relative to said first flexible joint;

whereby said motion translating assembly can translate irregular and variable total or partial vertical motion to stable rotational motion.

15. The motion translating assembly of claim 14 further comprising at least one adjustment means for adjusting a length of a part of said power input member to enable said crank gear to rotate reciprocally within a predetermined desirable region, comprising an electric motor, a first gear propelled by said electric motor, a second threaded gear engaged with said first gear and mounted on said power input member to drive said power input member upward or downward.

* * * * *